Sept. 13, 1932. J. W. WULLENWEBER 1,877,109
VEHICLE REFLECTING MIRROR STRUCTURE
Filed June 9, 1930 2 Sheets-Sheet 1

Inventor

J. W. Wullenweber

By Clarence A. O'Brien
Attorney

Sept. 13, 1932.   J. W. WULLENWEBER   1,877,109
VEHICLE REFLECTING MIRROR STRUCTURE
Filed June 9, 1930   2 Sheets-Sheet 2
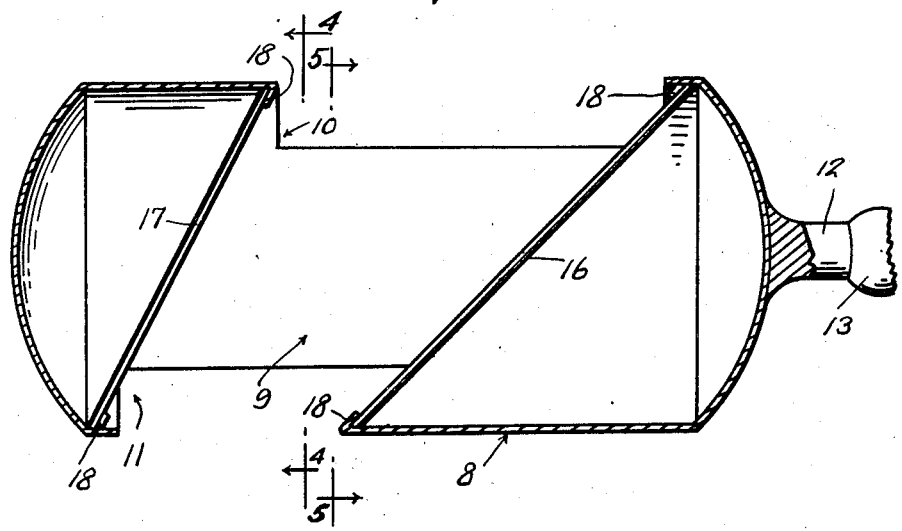
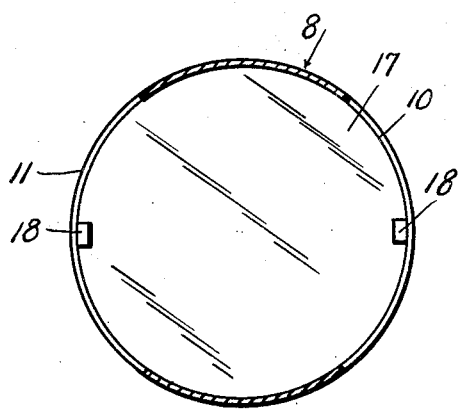
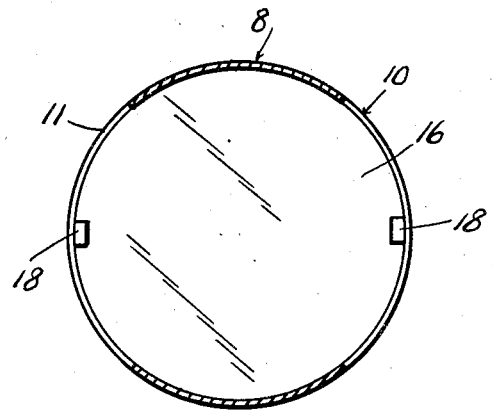
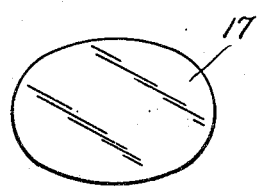
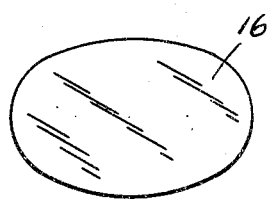
Inventor
J. W. Wullenweber
By Clarence A. O'Brien
Attorney Patented Sept. 13, 1932

1,877,109

UNITED STATES PATENT OFFICE

JOHN WILLIAM WULLENWEBER, OF BELVIDERE, ILLINOIS

VEHICLE REFLECTING MIRROR STRUCTURE

Application filed June 9, 1930. Serial No. 459,949.

This invention relates to a motor vehicle attachment or appliance for disposition on the forward portion of the body of the vehicle in a position to reflect images in a unique manner to facilitate safe driving on highways and the like.

More explicitly stated, I have constructed a simple and economical duplex mirror equipped device wherein the mirrors are arranged in periscopical relationship in a manner to enable the driver of a vehicle to visualize oncoming vehicles on the left hand side of the highway.

It is a matter of common knowledge that in driving on highways, it is frequently dangerous, when in a line of vehicles, to attempt to get out of line and drive along the left hand side of the highway with a view toward approaching the front of the line of vehicles. This is especially true when the driver is back of a huge truck or large vehicle such as obstructs his vision in a manner to ascertain the approximate position of oncoming vehicles on the opposite side of the road.

The purpose of this invention is to provide a simple and economical double mirror-equipped device, wherein the mirrors are so arranged as to permit reflections to be projected from one mirror to the other and from the latter mirror to the driver so as to permit him to obtain a reasonably clear perspective of approaching vehicles to the left of the highway before attempting to drive out of line.

The particular construction and arrangement of details embodied in this improved contribution to the art will become more specifically apparent from the following description and drawings.

In the drawings:

Figure 3 is a horizontal section.

Figure 1:
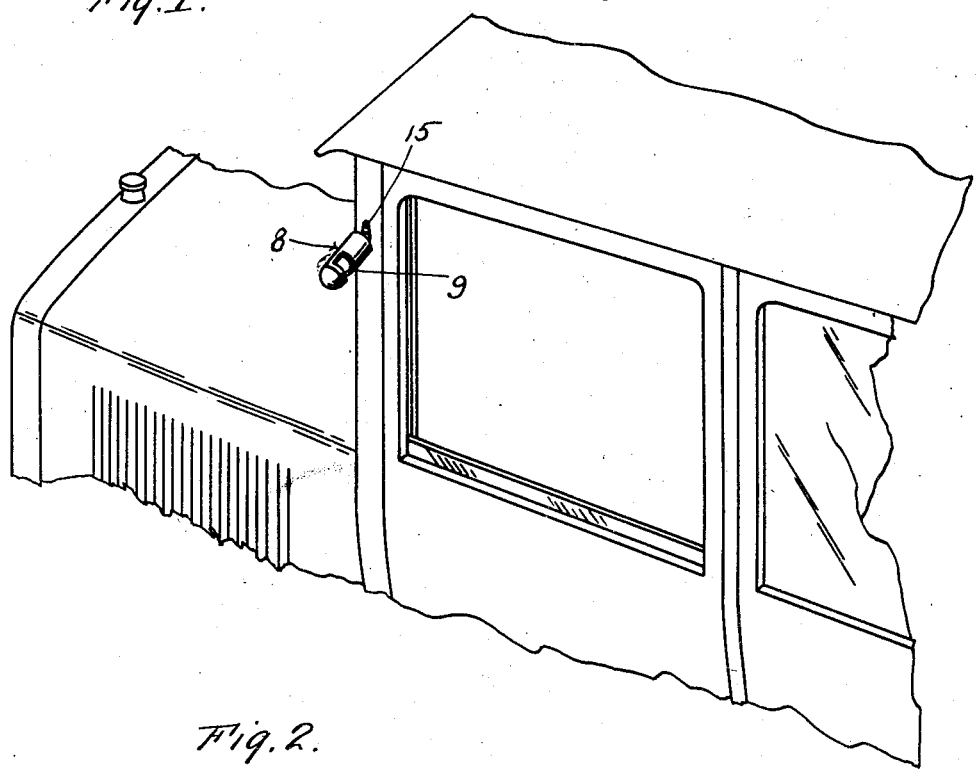
Figure 1 is a perspective view of an automobile equipped with a device constructed in accordance with the present invention.
Figure 2:
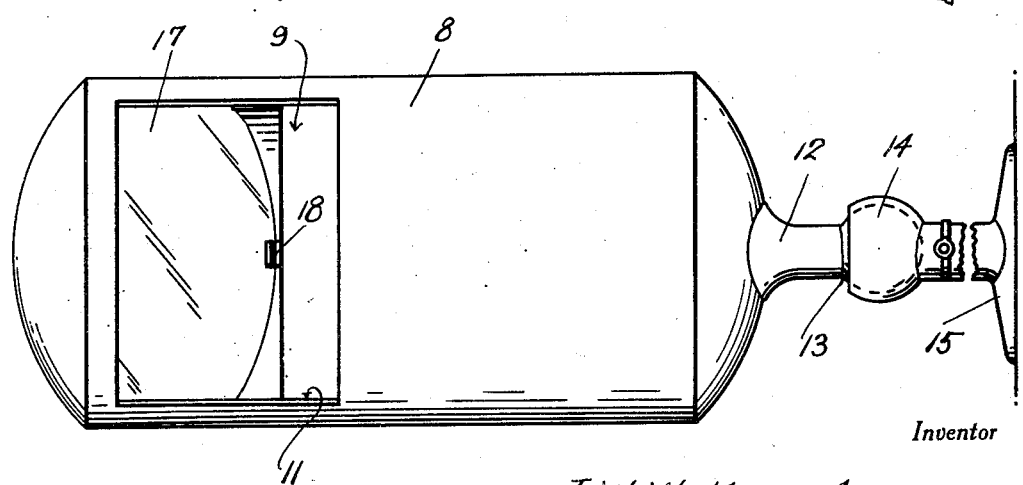
Figure 2 is a rear side elevational view thereof.

Figures 4 and 5 are transverse sections on the lines 4—4 and 5—5 respectively of Figure 3.

Figures 6 and 7 are detail views of the companion mirrors.

In the preferred embodiment of the invention, I have shown a casing or housing generally represented by the numeral 8 and in the drawings represented as of suitable ornamental configuration, being illustrated as of cylindrical form. For economy in construction and manufacture, it is of hollow construction as represented in Figure 3, and stamped from sheet metal or analogous material to provide a sort of a diagonal passage generally represented by the numeral 9.

It includes an entrance at the front as indicated at 10 and a rear exit as at 11. This passage is disposed in a line substantially parallel with the line of vision. At the right hand end is a shank 12 carrying a ball connection 13 adjustably fitted in a companion socket 14 constituting a part of the attaching bracket 15. This permits the structure to be adjustably supported from the forward portion of the vehicle, for instance at the point shown in Figure 1. Also, it locates the passage 9 in a horizontal plane, so that the entrance openings 10 and 11 will be properly located for effective reflective purposes.

The reflectors may be in the form of mirrors and I have found it convenient to provide two of them. The primary reflector 16 is disposed on a diagonal line at one end of the passage 9 in a position to receive reflection of images in advance of the entrance opening 10. This primary mirror or reflector 16 is slightly larger than the secondary reflecting mirror 17. Both mirrors are somewhat ovate in general configuration.

The respective spaced parallel angularity of the mirrors is such as to permit the images received on the mirror 16 to be reflected across to the mirror 17 and to permit the images of the mirror 17 to be visualized through the rear opening 11 by the operator of the car.

The mirrors are suitably held in place by bendable retaining tongues 18 and surrounding rim structure if desired.

The gist of the invention, it is understood, is in the provision of a suitable housing provided with attaching means for connection to an appropriate portion of the vehicle within clear vision of the driver, the housing having the light passage extending therethrough with mirrors on opposite sides thereof disposed in a sort of a periscopic relationship so as to diverse the reflection of images from the mirror 16 onto the mirror 17 and from the mirror 17 rearwardly through the outlet 11 to be visualized by the driver of the car.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

An attachment of the character described for automobiles comprising an elongated cylinder of circular cross section for disposition transversely relative to the automobile, said cylinder having overlapping openings in its diametrically opposite front and rear sides, one of the openings being adjacent one end of the cylinder, the other of said openings being adjacent the other end of the cylinder, a pair of spaced oval mirrors mounted obliquely in the cylinder, said mirrors being cooperative to reflect to the operator of the automobile objects in front and to one side of said automobile through the openings, a shank rigidly mounted centrally on one end of the cylinder and projecting therefrom longitudinally with respect to the cylinder, said cylinder being closed at both ends thereof to protect said mirrors.

In testimony whereof I affix my signature.

JOHN WILLIAM WULLENWEBER.